(12) United States Patent
Shinohara et al.

(10) Patent No.: US 12,386,369 B2
(45) Date of Patent: Aug. 12, 2025

(54) SYSTEM, CONTROL DEVICE, AND CONTROL METHOD FOR REMOTE CONTROL OF THE VEHICLE

(71) Applicant: TOYOTA JIDOSHA KABUSHIKI KAISHA, Toyota (JP)

(72) Inventors: Toshiki Shinohara, Toyota (JP); Masataka Okuda, Toyota (JP); Masatoshi Kakutani, Miyoshi (JP); Kaoru Yoshida, Nisshin (JP); Kanade Kuriyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 18/446,547

(22) Filed: Aug. 9, 2023

(65) Prior Publication Data

US 2024/0134381 A1 Apr. 25, 2024
US 2024/0231394 A9 Jul. 11, 2024

(30) Foreign Application Priority Data

Oct. 25, 2022 (JP) .................... 2022-170283

(51) Int. Cl.
| | |
|---|---|
| *G05D 1/02* | (2020.01) |
| *G05D 1/223* | (2024.01) |
| *G05D 1/692* | (2024.01) |
| *G05D 1/695* | (2024.01) |

(Continued)

(52) U.S. Cl.
CPC ............ *G05D 1/695* (2024.01); *G05D 1/223* (2024.01); *G05D 1/692* (2024.01); *G05D 1/6987* (2024.01); *G08G 1/0125* (2013.01)

(58) Field of Classification Search
CPC .............................. G05D 1/695; G05D 1/6987
See application file for complete search history.

(56) References Cited

U.S. PATENT DOCUMENTS

| | | | |
|---|---|---|---|
| 9,483,938 B1 * | 11/2016 | Bouillet | G08G 1/0145 |
| 2019/0382003 A1 | 12/2019 | Jiang et al. | |
| 2020/0193818 A1 * | 6/2020 | Cross | G08G 1/087 |

(Continued)

FOREIGN PATENT DOCUMENTS

| | | |
|---|---|---|
| JP | 2020-009428 A | 1/2020 |
| JP | 2020-177292 A | 10/2020 |

(Continued)

*Primary Examiner* — Jess Whittington
(74) *Attorney, Agent, or Firm* — SoraIP, Inc.

(57) ABSTRACT

A system includes a vehicle and a control device. The vehicle includes a reception unit for receiving an instruction related to remote control from the control device, a vehicle control unit for executing any one of first vehicle control and second vehicle control, the first vehicle control being control based on the instruction related to the remote control, and the second vehicle control being control determined by the vehicle itself in accordance with a traveling environment, and a transmission unit for notifying a predetermined control result to the control device when the second vehicle control is executed by the vehicle control unit. The control device includes a remote control unit, a transmission unit, and a reception unit. When the control result is notified from the vehicle, the remote control unit of the control device executes the remote control based on a content of the control result.

3 Claims, 4 Drawing Sheets

(51) Int. Cl.
*G05D 1/698* (2024.01)
*G08G 1/01* (2006.01)

(56) References Cited

U.S. PATENT DOCUMENTS

| | | | |
|---|---|---|---|
| 2020/0301772 A1* | 9/2020 | McMenemy | G05B 23/0243 |
| 2020/0326702 A1 | 10/2020 | Iwamoto et al. | |
| 2021/0039673 A1* | 2/2021 | Oyama | G08G 1/162 |
| 2022/0048533 A1* | 2/2022 | Ödblom | G06F 11/3698 |
| 2022/0108262 A1* | 4/2022 | Cella | G05B 17/02 |
| 2022/0157090 A1* | 5/2022 | Sakata | G07C 5/085 |
| 2023/0081876 A1 | 3/2023 | Matsumoto | |
| 2024/0003700 A1* | 1/2024 | Son | G06T 17/05 |
| 2024/0357014 A1* | 10/2024 | Kolberg | H04L 67/34 |

FOREIGN PATENT DOCUMENTS

| | | |
|---|---|---|
| JP | 2021-024457 A | 2/2021 |
| JP | 2021-170191 A | 10/2021 |

\* cited by examiner

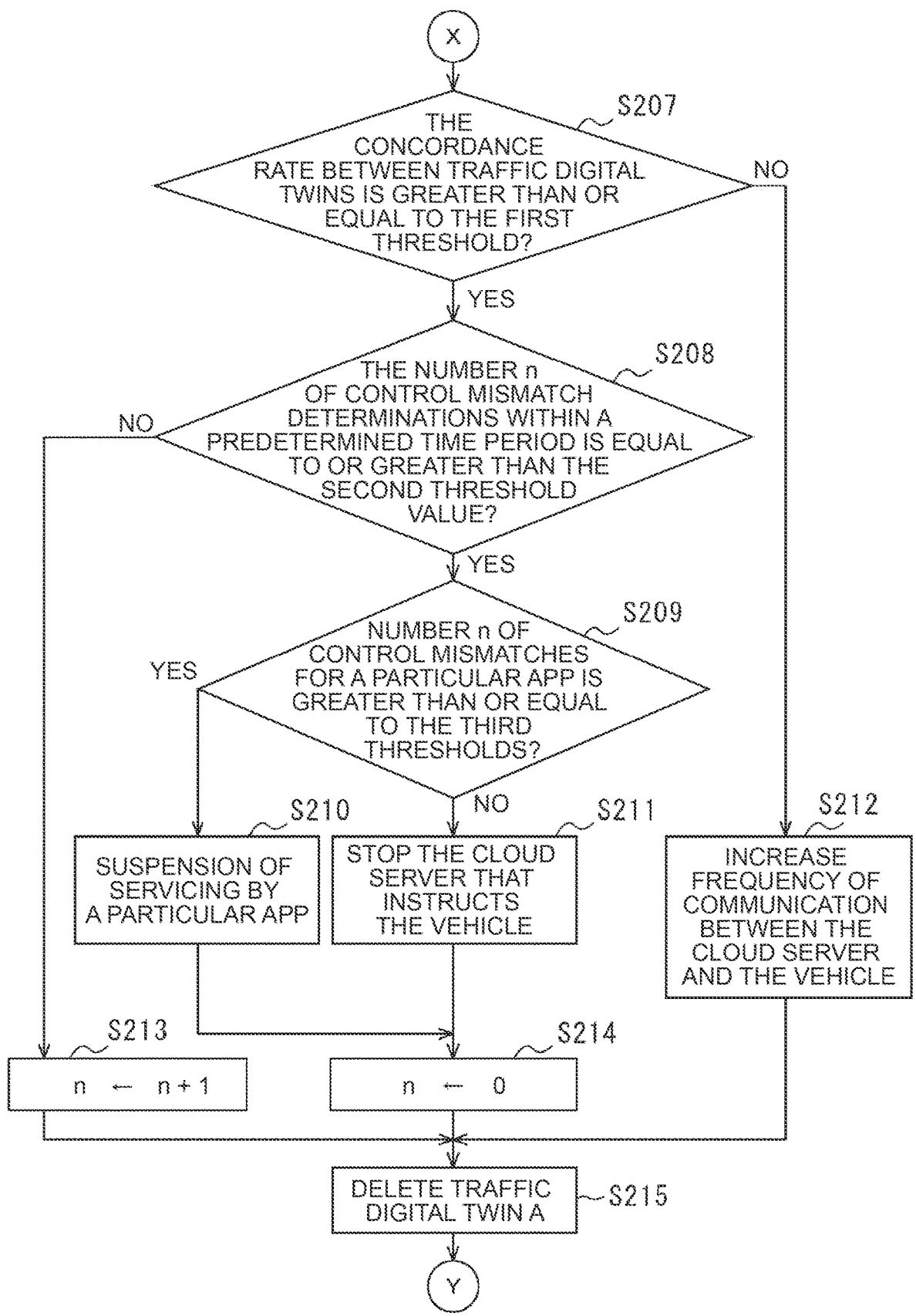

TRAFFIC DIGITAL TWIN O
WHEN CREATING CLOUD INSTRUCTIONS

EMERGENCY BRAKING

TRAFFIC DIGITAL TWIN A
AFTER TIME t
(DIGITAL TWIN O ONLY)

TRAFFIC DIGITAL TWIN B
AFTER TIME t
(DIGITAL TWIN O &
REAL WORLD REFLECTION)

SYSTEM, CONTROL DEVICE, AND CONTROL METHOD FOR REMOTE CONTROL OF THE VEHICLE

CROSS-REFERENCE TO RELATED APPLICATION

This application claims priority to Japanese Patent Application No. 2022-170283 filed on Oct. 25, 2022, incorporated herein by reference in its entirety.

BACKGROUND

1. Technical Field

The present disclosure relates to a control device for performing remote control of a vehicle, a system including a control device and a vehicle, and the like.

2. Description of Related Art

Japanese Unexamined Patent Application Publication No. 2021-024457 (JP 2021-024457 A) discloses a vehicle travel control system that determines whether a path plan for autonomous driving and an autonomous driving control need to be changed based on cloud information including travel information of other vehicles, and controls a travel behavior of the host vehicle based on the cloud information and the host vehicle travel information according to whether the change is necessary.

SUMMARY

When an instruction related to remote control is given from the cloud server to the vehicle, if the reliability of the instruction is low, the possibility of the remote control being executed is reduced, which leads to unnecessary consumption of a communication band between the cloud server and the vehicle. Therefore, there is room for further study on a method of performing remote control of a vehicle based on cloud information.

The present disclosure has been made in view of the above problem, and an object thereof is to provide a system and the like capable of suitably performing remote control of a vehicle based on cloud information.

In order to solve the above problem, an aspect of the technology of the present disclosure is a system including a vehicle and a control device for executing remote control of the vehicle. The vehicle includes a reception unit for receiving an instruction related to the remote control from the control device, a vehicle control unit for executing any one of first vehicle control and second vehicle control that is different from the first vehicle control, the first vehicle control being control based on the instruction related to the remote control, and the second vehicle control being control determined by the vehicle itself in accordance with a traveling environment, and a transmission unit for notifying a predetermined control result to the control device when the second vehicle control is executed by the vehicle control unit. The control device includes a remote control unit for controlling an instruction related to the remote control for the vehicle based on predetermined information, a transmission unit for transmitting the instruction related to the remote control to the vehicle, and a reception unit for receiving a notification of the control result from the vehicle. When the control result is notified from the vehicle, the remote control unit of the control device executes the remote control based on a content of the control result.

According to the system and the like of the present disclosure, when the vehicle executes a control different from the control based on the instruction related to the remote control from the cloud, the remote control is performed based on the content of the control result notified from the vehicle. Accordingly, it is possible to suitably perform the remote control of the vehicle based on the cloud information.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2B is a process flow chart of remote control executed by the control device.

DETAILED DESCRIPTION OF EMBODIMENTS

In the system of the present disclosure, when the vehicle performs the vehicle control different from the cloud instruction, the vehicle notifies the cloud side of the control mismatch, and the cloud side analyzes the cause of the control mismatch based on the notification. This improves the reliability of the cloud instruction. Hereinafter, embodiments of the present disclosure will be described in detail with reference to the drawings.

Embodiment

Configuration

Figure 1:
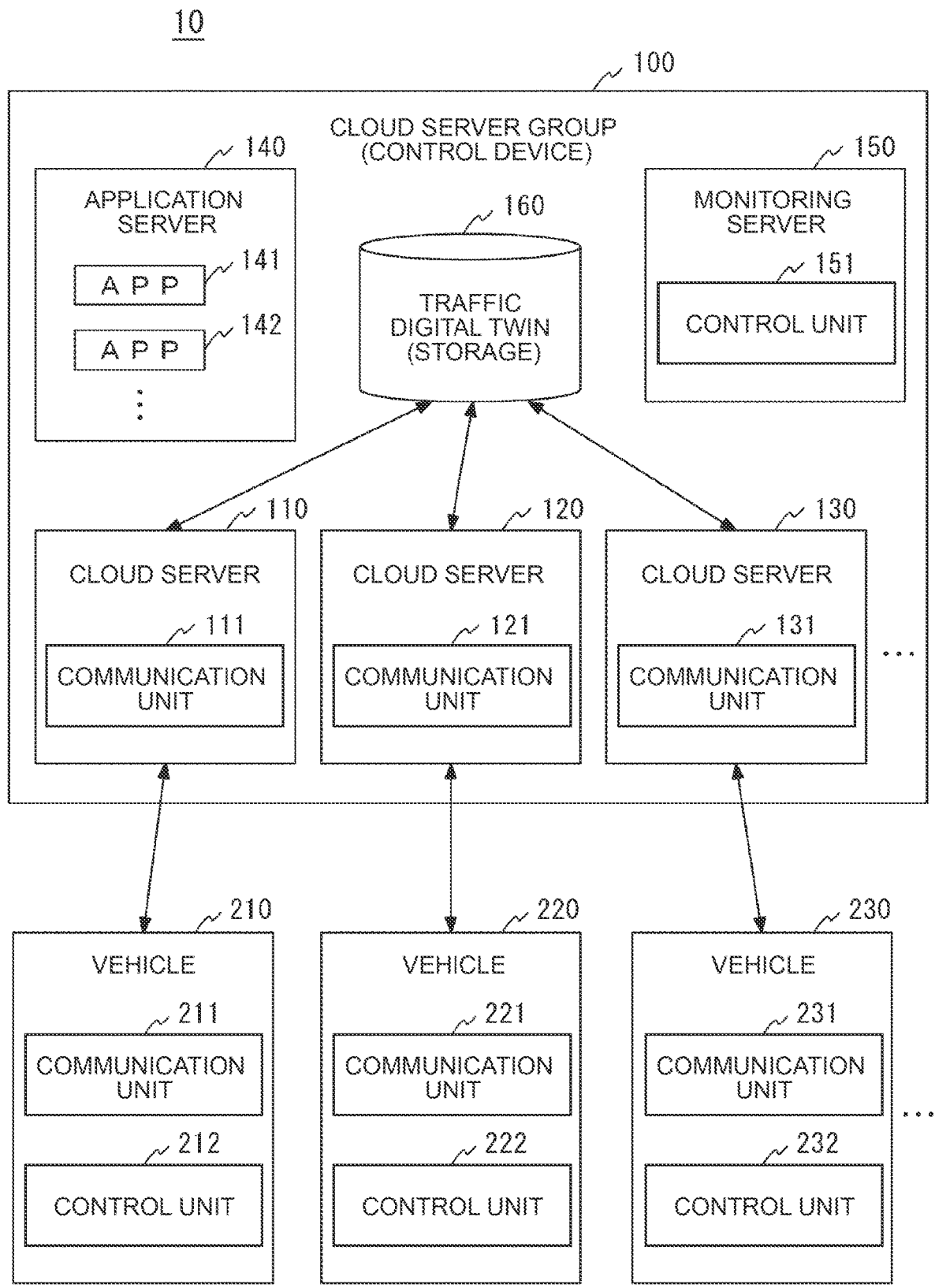
FIG. 1 is a schematic configuration diagram of a system according to an embodiment of the present disclosure.

FIG. 1 is a schematic diagram illustrating an example of an overall configuration of a system 10 according to an embodiment of the present disclosure. The system 10 illustrated in FIG. 1 includes a cloud server group 100 and a plurality of vehicles 210, 220, and 230 in a configuration.

(1) Cloud Servers

The cloud server group 100 is a control device capable of performing predetermined control by communicating with the plurality of vehicles 210, 220, and 230. The cloud server group 100 can provide a predetermined service such as a traffic remote control service to the vehicle 210, for example, on the basis of vehicle data including information related to vehicle states acquired from the plurality of vehicles 210, 220, and 230, respectively.

The cloud server group 100 includes a plurality of cloud servers 110, 120, and 130, an application server 140, a monitoring server 150, and a traffic digital twin 160.

The plurality of cloud servers 110, 120, and 130 include communication units 111, 121, and 131, respectively, and are communicably connected to the plurality of vehicles 210, 220, and 230. The communication units 111, 121, and 131 perform communication with the connected vehicles 210, 220, and 230. The communication units 111, 121, and 131 receive vehicle data including information related to the state of each vehicle (the position, speed, traveling direction, and the like of the vehicle), data related to the generation of the traffic digital twin 160 (data related to the surroundings of the vehicle, data related to the communication quality, and the like), control results related to a predetermined service (described later), and the like (reception unit). The cloud servers 110, 120, and 130 can transmit information, data, control instructions, and the like necessary for the service to all or a part of the vehicles 210, 220, and 230 that have requested the predetermined service (transmission unit). The cloud servers 110, 120, and 130 of the present embodiment can transmit an instruction (cloud instruction) regarding remote control based on the traffic digital twin 160 to all or a part of the vehicles 210, 220, and 230 requesting the service according to the control of the application server 140 and the monitoring server 150 (transmission unit).

The application server 140 includes one or more applications (APP) 141, 142 for implementing predetermined services (functions) to be provided to the plurality of vehicles 210, 220, and 230. Examples of the service realized by the applications 141 and 142 include a traffic remote service related to movement (running, stopping, turning) of the vehicles 210, 220, and 230. The applications 141 and 142 may implement services provided to all of the vehicles 210, 220, and 230. The applications 141 and 142 may implement services provided to a part of the vehicles 210, 220, and 230.

The monitoring server 150 includes a control unit (remote control unit) 151, and monitors and controls vehicle control executed by the plurality of vehicles 210, 220, and 230. Specifically, the control unit 151 monitors whether the vehicles 210, 220, and 230 are executing vehicle control in accordance with the service provided by the applications 141 and 142, based on the control results notified from the vehicles 210, 220, and 230 via the cloud servers 110, 120, and 130. When all or part of the vehicles 210, 220, and 230 are not executing the vehicle control according to the service, the control unit 151 suitably controls the service to be provided to all or part of the vehicles 210, 220, and 230 by performing predetermined processing and instructions to the plurality of cloud servers 110, 120, and 130 and the traffic digital twin 160.

The traffic digital twin 160 is a virtual world (virtual space) in which a real world (real space) in which a plurality of vehicles 210, 220, and 230 exist is reproduced on a cloud computer in synchronization with a real world. The traffic digital twin 160 is generated based on data related to current and past vehicle conditions acquired (collected) from the plurality of vehicles 210, 220, and 230 via the plurality of cloud servers 110, 120, and 130. In the traffic digital twin 160, an object (a moving object/a stationary object) and a traffic situation on a traveling road in a place (a road, a parking lot, or the like) where a vehicle participating in the system 10 including the plurality of vehicles 210, 220, and 230 can travel are all reproduced. Examples of the information included in the data for generating the traffic digital twin 160 include vehicle information (VIN and the like), information on other vehicles (including a bicycle, a pedestrian, and the like), map information, time information (time stamp), position information (GPS latitude/longitude), and trajectory information (vehicle speed, direction, and the like) that is a travel track.

All or some of the configurations included in the cloud server group 100 include a processor such as a Central Processing Unit (CPU), a memory such as a Random Access Memory (RAM), a readable/writable storage medium such as a hard disk drive (HDD) or a solid state drive (SSD), an input/output interface, and the like, and realize all or some of the functions described above by the processor reading and executing a program stored in the memory.

(2) Vehicle

The plurality of vehicles 210, 220, and 230 are mobility configured to be able to communicate with the plurality of cloud servers 110, 120, and 130 of the cloud server group 100. The vehicles 210, 220, and 230 include communication units 211, 221, and 231, and control units 212, 222, and 232, respectively. In FIG. 1, an example is shown in which the vehicle 210 is connected to the cloud server 110, the vehicle 220 is connected to the cloud server 120, and the vehicle 230 is connected to the cloud server 130 in a one-to-one manner, but one cloud server may be connected to a plurality of vehicles, or one vehicle may be connected to a plurality of cloud servers. The number of vehicles communicating with the cloud server group 100 is not particularly limited.

The communication units 211, 221, and 231 perform communication with the cloud servers 110, 120, and 130, respectively. The communication units 211, 221, and 231 can provide the cloud server group 100 with information related to the state of the host vehicle and data necessary for generating the traffic digital twin 160 in the cloud server group 100 (transmission unit). The information regarding the state of the host vehicle includes the position of the vehicle, the speed of the vehicle, the traveling direction of the vehicle, and the like. The data necessary for generating the traffic digital twin 160 includes data related to other vehicles, such as other vehicles, buildings, and pedestrians, which are objects existing around the vehicle. Various sensors (not shown) mounted on the vehicle can be used to acquire such information and data.

Further, the communication units 211, 221, and 231 receive, from the cloud server group 100 via the cloud servers 110, 120, and 130, an instruction regarding a service requested from the cloud server group 100, for example, an instruction regarding remote control (cloud instruction) based on the traffic digital twin 160 (reception unit).

The control units (vehicle control units) 212, 222, and 232 control the overall control of the vehicles 210, 220, and 230 including communication with the cloud server group 100 via the communication units 211, 221, and 231, and control of vehicle travel, respectively. The control units 212, 222, and 232 of the present embodiment notify the cloud server group 100 of the fact as a control result when the vehicles 210, 220, and 230 perform the vehicle control (or the vehicle operation) determined by the vehicle in accordance with the traveling environment instead of the vehicle control (or the vehicle operation) based on the cloud instruction received from the cloud server group 100 regarding the service.

The configurations of all or a part of the communication units 211, 221, and 231 and the control units 212, 222, and 232 described above typically include a processor such as a CPU, a memory such as a RAM, a readable/writable storage medium such as a hard disk drive and a solid state drive, an input/output interface, and the like, and realize all or a part of the functions described above by the processor reading and executing a program stored in the memory.

Control

Figure 2A:
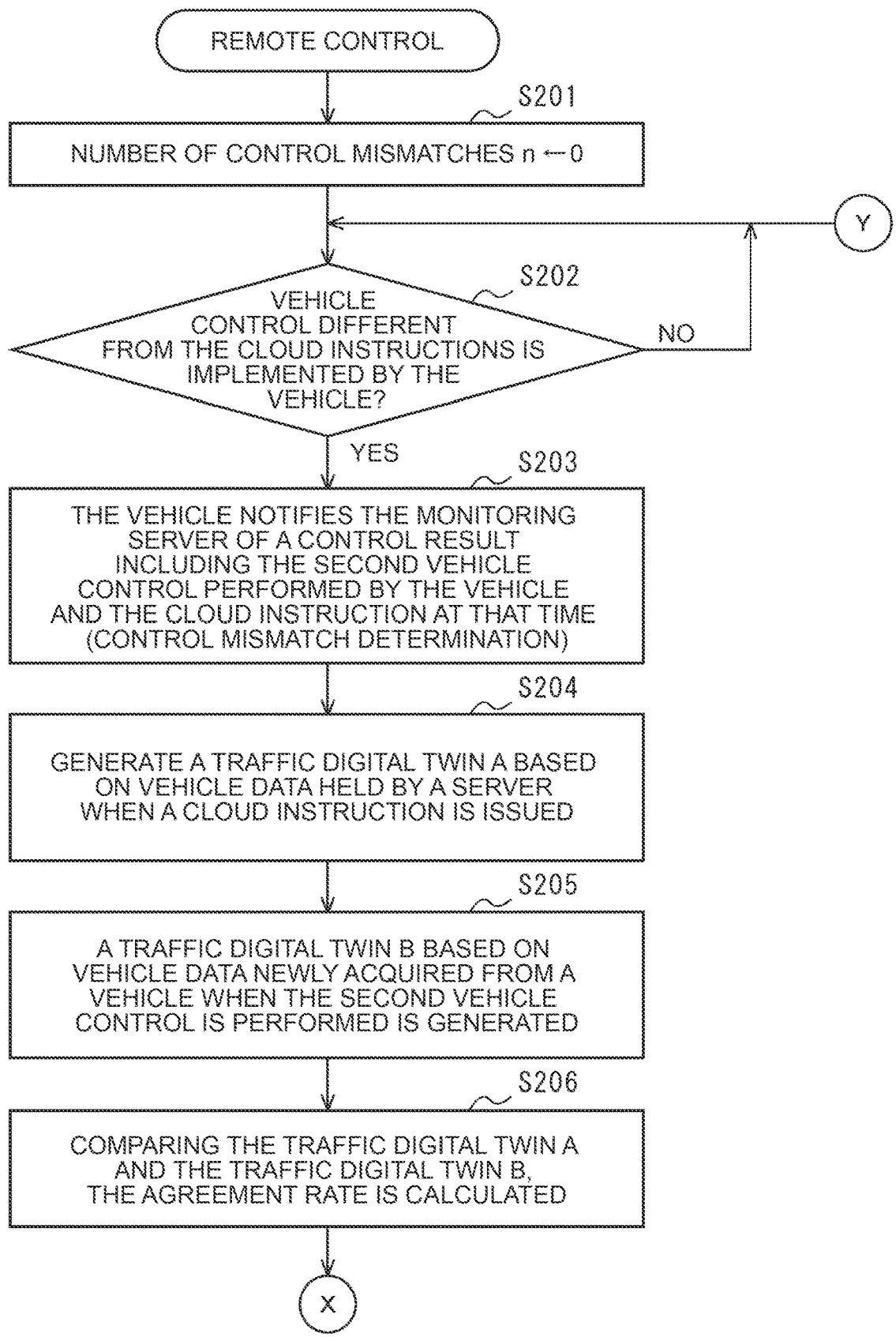
FIG. 2A is a process flow chart of the remote control executed by the control device.
Figure 3:
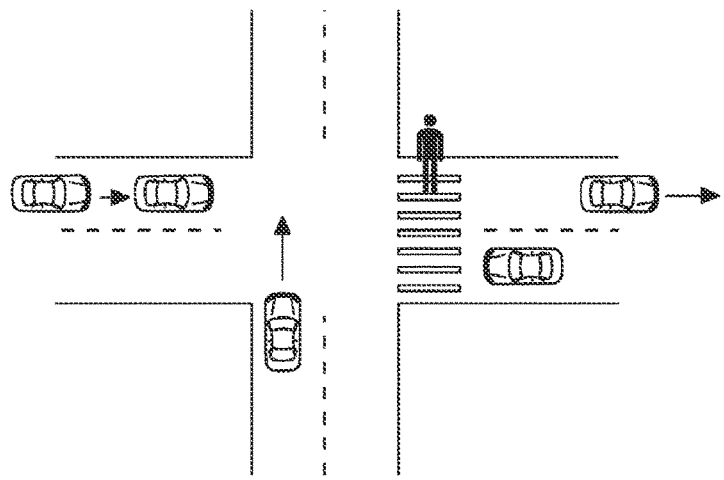
FIG. 3 is a diagram illustrating an example of a digital twin generated image.
Figure 3:
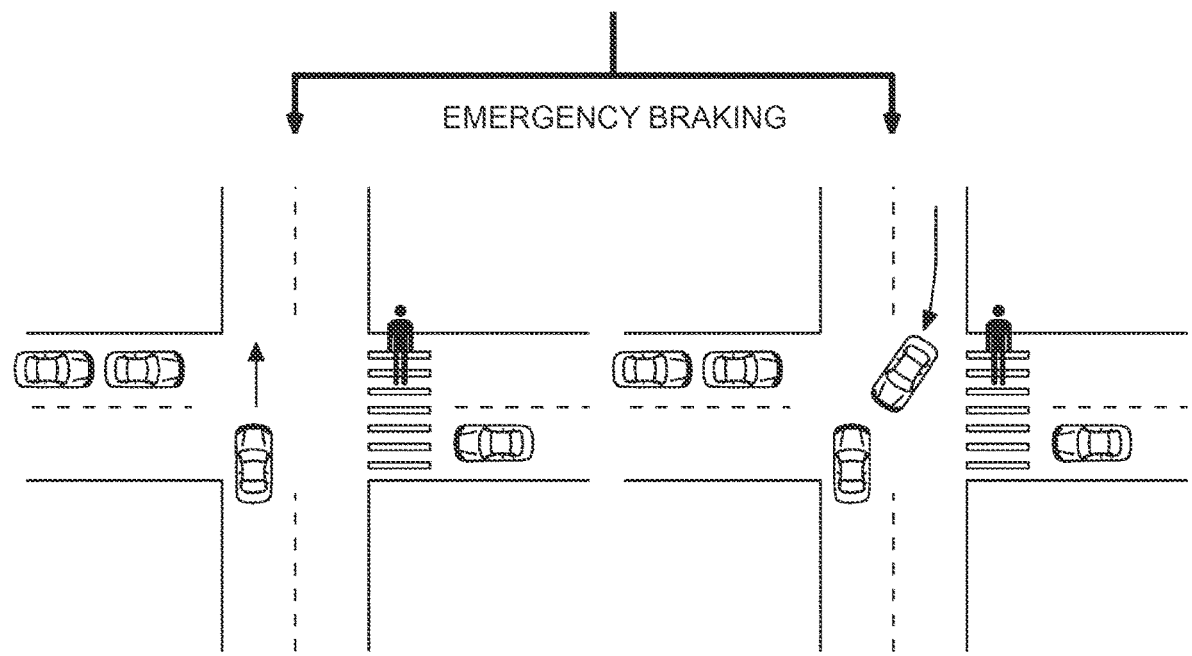

Referring now further to FIG. 2A, FIG. 2B, and FIG. 3, the control performed by the system 10 according to the present embodiment will now be described. FIGS. 2A and 2B are flow charts for describing a process sequence of remote control executed in the system 10. The process of FIG. 2A and the process of FIG. 2B are connected by the couplers X and Y.

The remote control illustrated in FIG. 2A and FIG. 2B is repeatedly performed until communication is established with the cloud server group 100 and is initiated individually for particular vehicles that are serviced for remote control based on the traffic digital twin 160 and communication is interrupted. Hereinafter, the remote control will be described by taking a case where a specific vehicle is the vehicle 210 as an example.

S201

The control unit 151 of the monitoring server 150 resets the number n of control mismatches to be used in the control mismatch determination (n is substituted with zero). When the control unit 151 resets the number of control mismatches n, the process proceeds to S202.

S202

The control unit 212 of the vehicle 210 determines whether or not the vehicle 210 has performed vehicle control different from the cloud instruction. More specifically, the control unit 212 determines whether or not the vehicle 210 has performed a vehicle control (hereinafter referred to as "second vehicle control") different from the vehicle control (hereinafter referred to as "first vehicle control") based on the cloud instruction transmitted from the cloud server 110. The first vehicle control is cloud control based on a cloud instruction according to a service to be provided. The second vehicle control is an in-vehicle control in which a safety protection function (automatic brake, lane departure prevention, and the like) mounted on the vehicle 210 is preferentially determined according to the traveling environment regardless of the first vehicle control.

As a specific example, a second vehicle control in which an emergency brake based on an automatic braking function is activated due to an unexpected pedestrian jumping or the like can be shown with respect to a first vehicle control in which a straight traveling is continued at a current speed based on a cloud instruction. Further, with respect to the first vehicle control of increasing the distance from the front vehicle at a predetermined deceleration based on the cloud instruction, it is possible to indicate the second vehicle control that the braking operation based on the automatic braking function is activated because the deceleration is insufficient. Further, with respect to the first vehicle control of performing the lane change based on the cloud instruction, it is possible to indicate the second vehicle control that the steering operation of stopping the lane change based on the automatic steering function is activated because there is a possibility that a danger due to the rear lane of the lane of the approach destination occurs. Further, it is possible to indicate the second vehicle control in which the steering operation is operated at the steering angle b larger than the steering angle a by a predetermined value or more with respect to the first vehicle control in which the curve travels at the steering angle a based on the cloud instruction.

When the control unit 212 determines that the vehicle 210 has performed the vehicle control that differs from the cloud instruction (S202, Yes), the process proceeds to S203. On the other hand, when the control unit 212 determines that the vehicle 210 has performed the vehicle control based on the cloud instruction (S202, no), the normal remote control is continuously performed unless the vehicle 210 performs the vehicle control that differs from the cloud instruction.

S203

The communication unit 211 of the vehicle 210 notifies the monitoring server 150 of the control result including at least the second vehicle control performed by the vehicle 210 and the information of the cloud instruction transmitted from the cloud server 110 when the second vehicle control is performed, via the cloud server 110. The information of the cloud instruction includes, for example, an instruction value, a control value, and the like, which instructions are executed from which application of the application server 140 can be grasped. Upon receiving the notification (cloud service non-safety notification), the monitoring server 150 determines that the first vehicle control based on the cloud instruction performed in accordance with the traffic digital twin 160 does not match the second vehicle control actually performed by the vehicle. When the communication unit 211 notifies the monitoring server 150 of the control result of the vehicle 210, the process proceeds to S204.

S204

The control unit 151 of the monitoring server 150 generates the traffic digital twin A (first traffic digital twin) based on the vehicle data held by the cloud server group 100 when the vehicle 210 performs the second vehicle control in accordance with the control result notified from the vehicle 210. The traffic digital twin A is generated by temporarily storing data and information held when the cloud server group 100 creates a cloud instruction in a storage different from the current storage, and performing a simulation using the stored data and information. The target area generated as the traffic digital twin A need not be all traffic area ranges including the plurality of vehicles 210, 220, 230, but is sufficient in some ranges sufficient to identify the factors (unsafe factors) that led to the vehicle 210 performing the second vehicle control.

An example of the traffic digital twin A is shown in the lower left view of FIG. 3. In the example of FIG. 3, the traffic digital twin A at the time t after the emergency brake is activated by simulation is estimated from the traffic digital twin O generated based on the data and information held by the cloud server group 100 when the cloud instruction is created. When the traffic digital twin A is generated by the control unit 151, the process proceeds to S205.

S205

The control unit 151 of the monitoring server 150 generates the traffic digital twin B (second traffic digital twin) based on the vehicle data newly acquired from the vehicle 210 and other vehicles 220 and 230 when the vehicle 210 executes the second vehicle control in accordance with the control result notified from the vehicle 210. The traffic digital twin B is generated by performing a simulation using data and information that reflect the data currently held by the cloud server group 100 and the vehicle data newly acquired from the information. The target area generated as the traffic digital twin B is the same as the target area generated as the traffic digital twin A described above.

An example of the traffic digital twin B is shown in the lower right view of FIG. 3. In the example of FIG. 3, the traffic digital twin O generated on the basis of the data and information held by the cloud server group 100 when the cloud instruction is created reflects the vehicle data of the real world newly acquired from each vehicle, and the traffic digital twin B at the time point when the time t after the emergency brake is activated by the simulation is estimated. When the traffic digital twin B is generated by the control unit 151, the process proceeds to S206.

S206

The control unit 151 of the monitoring server 150 compares the generated traffic digital twin A with the traffic digital twin B, and calculates a coincidence rate between the two digital twins. In the example of FIG. 3, the traffic digital twin A shown in the lower left figure is compared with the traffic digital twin B shown in the lower right figure, and the coincidence rate is calculated. Note that the agreement rate can be arbitrarily defined, but can be, for example, a ratio occupied by a region having a change in the target area. When the control unit 151 compares the traffic digital twin A with the traffic digital twin B and calculates the coincidence rate, the process proceeds to S207.

S207

The control unit 151 of the monitoring server 150 determines whether or not the coincidence rate between the traffic digital twin A and the traffic digital twin B is equal to or greater than the first threshold value. This determination is made in order to confirm the level of completion of the traffic digital twin constructed by the cloud server group 100. Therefore, the first threshold value is set to an appropriate value corresponding to the height of the degree of completion to be determined. When the control unit 151 determines that the agreement rate between the digital twins is equal to or greater than the first threshold (S207, Yes), the process proceeds to S208. On the other hand, if the control unit 151 determines that the agreement rate between the digital twins is less than the first threshold (S207, No), the process proceeds to S212.

S208

The control unit 151 of the monitoring server 150 determines whether or not the number n of control mismatches determined so far by S203 within a predetermined period is equal to or greater than the second threshold. This determination is made in order to confirm whether the vehicle 210 frequently performs the second vehicle control different from the cloud instruction. Therefore, the second threshold value is set to an appropriate value corresponding to the frequency of execution of the second vehicle control to be determined. If the control unit 151 determines that the number n of control mismatch determinations within the predetermined period is equal to or greater than the second threshold (S208, Yes), the process proceeds to S209. On the other hand, if the control unit 151 determines that the number n of control mismatch determinations within the predetermined period is less than the second threshold (S208, No), the process proceeds to S213.

S209

The control unit 151 of the monitoring server 150 determines whether or not the number n of control mismatches regarding a particular application (a particular APP) among the applications 141 and 142 implemented by the application server 140 is equal to or greater than a third threshold. This determination is made to ascertain whether the second vehicle control of the vehicle 210 determined to be frequently performed in S208 is only relevant to a particular service. Therefore, the third threshold value is set to a value equal to or smaller than the second threshold value. If the control unit 151 determines that the number n of control mismatches for a particular application is greater than or equal to the third threshold (S209, Yes), the process proceeds to S210. On the other hand, if the control unit 151 determines that the number n of control mismatches for a particular application is less than the third threshold (S209, No), the process proceeds to S211.

S210

The control unit 151 of the monitoring server 150 stops providing the services to the vehicles 210, 220, and 230 by the specific application because the control mismatch determination is largely biased toward the specific application (specific APP). The stopping process is performed by the control unit 151 controlling the cloud servers 110, 120, and 130 and/or the application server 140. Note that the control unit 151 may notify the vehicles 210, 220, and 230 that the service provision by the specific application has been stopped. When the control unit 151 stops providing a service by a particular application, the process proceeds to S214.

S211

The control unit 151 of the monitoring server 150 stops all the service provision by the cloud server 110 connected to the vehicle 210 because the number of times n of the control mismatch determination is large even though there is no application corresponding to a particular application (a particular APP). The stopping process is performed by the control unit 151 controlling the cloud server 110. Note that the control unit 151 may notify the vehicle 210 that all service provision by the cloud server 110 has been stopped. In addition to stopping the service provision, the control unit 151 may instruct the restart of the cloud server 110. When all the services provided by the cloud server 110 are stopped by the control unit 151, the process proceeds to S214.

S212

Since the control unit 151 of the monitoring server 150 is low after the completion of the digital twin, it increases the frequency with which the vehicles 210, 220, and 230 communicate with the cloud servers 110, 120, and 130 in order to collect many pieces of vehicle data and increase the degree of completion. The control unit 151 controls the cloud servers 110, 120, and 130 to change the communication frequency. When the frequency of communication between the cloud servers 110, 120, and 130 and the vehicles 210, 220, and 230 is changed by the control unit 151, the process proceeds to S215.

S213

The control unit 151 of the monitoring server 150 increments the number of control mismatches n by one (n+1 is assigned to n). When the control unit 151 increments the number of control mismatches n by one, the process proceeds to S215.

S214

The control unit 151 of the monitoring server 150 resets the number n of control mismatches (assigns zero to n). When the control unit 151 resets the number of control mismatches n, the process proceeds to S215.

S215

The control unit 151 of the monitoring server 150 deletes the traffic digital twin A generated by S204. Also, data and information temporarily stored in another storage is deleted. When the traffic digital twin A is deleted by the control unit 151, the process proceeds to S202.

EFFECTS, ETC.

As described above, according to the system of the embodiment of the present disclosure, when the vehicle that is receiving the service such as the remote control from the cloud side performs the vehicle control different from the cloud instruction, the cloud side is notified of the information on the situation in which the vehicle control is performed. Then, the cloud side analyzes a factor that causes the vehicle to perform vehicle control different from the cloud instruction based on the notification, and separates whether the factor is in an application, a cloud server, or a degree of completion of a digital twin.

By this control, when a factor for performing vehicle control different from the cloud instruction in the vehicle is on the cloud side, it is possible to perform any one of the control of stopping the service provision, stopping the use of the cloud server, and enhancing the digital twin according to the notification content from the vehicle. Therefore, when an instruction related to remote control or the like is given to the vehicle from the cloud server group, it is possible to suppress a decrease in the reliability of the instruction based on the cloud information, and thus it is possible to suitably perform remote control of the vehicle.

Although an embodiment of the present disclosure has been described above, the present disclosure can be regarded as not only a system including a vehicle and a control device, but also a method executed by a system including a processor and a memory, a program for executing the method, a computer-readable non-transitory storage medium storing a program, and a control device alone.

The system and the like of the present disclosure are useful in a case where a vehicle is remotely controlled from the cloud side, for example.

What is claimed is:

1. A system comprising a vehicle and a control device for executing remote control of the vehicle, wherein
the vehicle includes
a first reception unit configured to receive an instruction related to the remote control from the control device,
a first processor configured to execute any one of first vehicle control and second vehicle control that is different from the first vehicle control, the first vehicle control being control based on the instruction related to the remote control, and the second vehicle control being control determined by the vehicle itself in accordance with a traveling environment, and
a first transmission unit configured to notify a predetermined control result to the control device when the second vehicle control is executed by the vehicle control unit;
the control device includes
a second processor configured to control the instruction related to the remote control for the vehicle based on predetermined information,
a second transmission unit configured to transmit the instruction related to the remote control to the vehicle, and
a second reception unit configured to receive a notification of the predetermined control result from the vehicle,
when the predetermined control result is notified from the vehicle, the second processor of the control device executes the remote control based on a content of the predetermined control result,
the predetermined information is a traffic digital twin provided in a virtual space that is time-synchronized with a real space based on vehicle data acquired from a plurality of vehicles including the vehicle of which the remote control is executed,
the predetermined control result includes at least information on the second vehicle control executed by the vehicle control unit and information on the instruction related to the remote control received by the vehicle from the control device, and
the second processor of the control device increases a frequency of acquiring the vehicle data from the plurality of vehicles when a matching rate of a first traffic digital twin and a second traffic digital twin is lower than a first threshold value, the first traffic digital twin being a digital twin generated based on the vehicle data held when the instruction related to the remote control is performed, and the second traffic digital twin being a digital twin generated based on the vehicle data in the real space when the vehicle control unit executes the second vehicle control.

2. A system comprising a vehicle and a control device for executing remote control of the vehicle, wherein
the vehicle includes
a first reception unit configured to receive an instruction related to the remote control from the control device,
a first processor configured to execute any one of first vehicle control and second vehicle control that is different from the first vehicle control, the first vehicle control being control based on the instruction related to the remote control, and the second vehicle control being control determined by the vehicle itself in accordance with a traveling environment, and
a first transmission unit configured to notify a predetermined control result to the control device when the second vehicle control is executed by the vehicle control unit;
the control device includes
a second processor configured to control the instruction related to the remote control for the vehicle based on predetermined information,
a second transmission unit configured to transmit the instruction related to the remote control to the vehicle, and
a second reception unit configured to receive a notification of the predetermined control result from the vehicle,
when the predetermined control result is notified from the vehicle, the second processor of the control device executes the remote control based on a content of the predetermined control result,
the predetermined information is a traffic digital twin provided in a virtual space that is time-synchronized with a real space based on vehicle data acquired from a plurality of vehicles including the vehicle of which the remote control is executed,
the predetermined control result includes at least information on the second vehicle control executed by the vehicle control unit and information on the instruction related to the remote control received by the vehicle from the control device, and
when the number of times that the predetermined control result is notified from the vehicle within a predetermined time exceeds a second threshold value, the second processor of the control device stops an operation of a server that gives the instruction related to the remote control to the vehicle.

3. A system comprising a vehicle and a control device for executing remote control of the vehicle, wherein
the vehicle includes
a first reception unit configured to receive an instruction related to the remote control from the control device,
a first processor configured to execute any one of first vehicle control and second vehicle control that is different from the first vehicle control, the first vehicle control being control based on the instruction related to the remote control, and the second vehicle control being control determined by the vehicle itself in accordance with a traveling environment, and
a first transmission unit configured to notify a predetermined control result to the control device when the second vehicle control is executed by the vehicle control unit;
the control device includes
a second processor configured to control the instruction related to the remote control for the vehicle based on predetermined information,
a second transmission unit configured to transmit the instruction related to the remote control to the vehicle, and a second reception unit configured to receive a notification of the predetermined control result from the vehicle, when the predetermined control result is notified from the vehicle, the second processor of the control device executes the remote control based on a content of the predetermined control result, the predetermined information is a traffic digital twin provided in a virtual space that is time-synchronized with a real space based on vehicle data acquired from a plurality of vehicles including the vehicle of which the remote control is executed, the predetermined control result includes at least information on the second vehicle control executed by the vehicle control unit and information on the instruction related to the remote control received by the vehicle from the control device, and when the number of times that the control result is notified from the vehicle within a predetermined time exceeds a second threshold value and the number of times of an instruction from a specific application among the instructions related to the remote control included in the predetermined control result exceeds a third threshold value, the second processor of the control device stops an operation of the specific application.

* * * * *